US012434883B2

(12) United States Patent
Christopher et al.

(10) Patent No.: US 12,434,883 B2
(45) Date of Patent: Oct. 7, 2025

(54) ACCESSORY ATTACHMENT ASSEMBLY FOR CONTAINER

(71) Applicant: Home Depot Product Authority, LLC, Atlanta, GA (US)

(72) Inventors: Brent Christopher, Centennial, CO (US); Kenneth Freeman, Centennial, CO (US)

(73) Assignee: Home Depot Product Authority, LLC, Atlanta, GA (US)

( * ) Notice: Subject to any disclaimer, the term of this patent is extended or adjusted under 35 U.S.C. 154(b) by 0 days.

(21) Appl. No.: 18/026,467

(22) PCT Filed: Mar. 14, 2023

(86) PCT No.: PCT/US2023/064327
§ 371 (c)(1),
(2) Date: Mar. 15, 2023

(87) PCT Pub. No.: WO2023/178095
PCT Pub. Date: Sep. 21, 2023

(65) Prior Publication Data
US 2024/0294305 A1 Sep. 5, 2024

Related U.S. Application Data

(60) Provisional application No. 63/431,791, filed on Dec. 12, 2022, provisional application No. 63/319,401, filed on Mar. 14, 2022.

(51) Int. Cl.
*B65D 25/20* (2006.01)
*B25H 3/02* (2006.01)

(52) U.S. Cl.
CPC ................ *B65D 25/20* (2013.01); *B25H 3/02* (2013.01)

(58) Field of Classification Search
CPC ........ B65D 25/20; B65D 67/02; B65D 69/00; B25H 3/023
USPC ................................................ 220/729, 23.4
See application file for complete search history.

(56) References Cited

U.S. PATENT DOCUMENTS

| | | | |
|---|---|---|---|
| D99,440 | S | 4/1936 | Levy |
| 3,648,830 | A | 3/1972 | Graf |
| D265,969 | S | 8/1982 | Koessler |
| D296,760 | S | 7/1988 | McGrath |
| D299,423 | S | 1/1989 | Davis |
| D315,093 | S | 3/1991 | Hanna |
| D323,453 | S | 1/1992 | Walther |
| D330,850 | S | 11/1992 | Roick |
| D339,058 | S | 9/1993 | Greenhut et al. |
| 6,059,135 | A | 5/2000 | James |

(Continued)

OTHER PUBLICATIONS

International Search and Written Opinion from international application No. PCT/US2023/064327, mailed Jul. 3, 2023, 15 pp.

(Continued)

*Primary Examiner* — Jeffrey R Allen
(74) *Attorney, Agent, or Firm* — Greenberg Traurig, LLP

(57) ABSTRACT

A container includes a plurality of sidewalls that define an enclosed area accessible by a removable lid, a mounting body coupled to at least one of the plurality of sidewalls, and an accessory attachment selectively attachable to the mounting body, the accessory attachment comprising a flexible portion that flexes to permit coupling of the accessory attachment to the mounting body.

14 Claims, 12 Drawing Sheets

(56) References Cited

U.S. PATENT DOCUMENTS

| | | | | |
|---|---|---|---|---|
| D454,294 | S | 3/2002 | Nishida et al. | |
| D548,573 | S | 8/2007 | Bascom et al. | |
| D553,758 | S | 10/2007 | Turjanski | |
| 7,334,680 | B2 * | 2/2008 | Cunningham ......... | B25H 3/023 220/729 |
| D581,253 | S | 11/2008 | Antonic | |
| D618,537 | S | 6/2010 | Panzer | |
| D625,580 | S | 10/2010 | Giordano | |
| D633,298 | S | 3/2011 | Tonelli | |
| D711,213 | S | 8/2014 | Schorn | |
| D727,657 | S | 4/2015 | Lim | |
| D735,023 | S | 7/2015 | Baldwin | |
| D735,564 | S | 8/2015 | Goodman | |
| D737,116 | S | 8/2015 | Lussier | |
| D752,898 | S | 4/2016 | Lim | |
| D753,987 | S | 4/2016 | Bernstein | |
| D761,638 | S | 7/2016 | Johnson | |
| D769,644 | S | 10/2016 | Jacobson | |
| D791,348 | S | 7/2017 | Singh | |
| D814,061 | S | 3/2018 | Singh | |
| D829,079 | S | 9/2018 | Halling | |
| D831,471 | S | 10/2018 | Kim | |
| D866,282 | S | 11/2019 | Ozeki | |
| D874,556 | S | 2/2020 | Hanudel | |
| 10,710,770 | B2 | 7/2020 | Kögel et al. | |
| D909,179 | S | 2/2021 | Kovacs | |
| D986,437 | S | 5/2023 | Albino | |
| D987,109 | S | 5/2023 | Kovacs | |
| D995,264 | S | 8/2023 | Ahlström | |
| D996,061 | S | 8/2023 | Rusakov | |
| D1,034,172 | S | 7/2024 | Morehouse | |
| D1,036,241 | S | 7/2024 | Kovacs | |
| 2004/0134818 | A1 | 7/2004 | Cunningham | |
| 2013/0126542 | A1 | 5/2013 | Lorek | |
| 2021/0337966 | A1 | 11/2021 | Nilsson | |
| 2021/0340757 | A1 | 11/2021 | Marino | |
| 2024/0286798 | A1 | 8/2024 | Christopher | |

OTHER PUBLICATIONS

Office Action from Chinese application No. 202430272774.4, dated Jan. 8, 2025, 3 pp.

Non-final Office Action from U.S. Appl. No. 29/886,850, dated Sep. 5, 2024, 6 pp.

"Build-Out 6 Pc. Modular Tool Storage Accessory Set", first reviewed on Jan. 17, 2024, homedepot.com, site visited Feb. 22, 2025: https://www.homedepot.com/p/Husky-Build-Out-6-Pc-Modular-Tool-Storage-Accessory-Set-HSKBOA6PC1CB/32577 5770#overlay (Year: 2024).

Non-final Office Action from U.S. Appl. No. 29/886,848, dated Feb. 27, 2025, 10 pp.

* cited by examiner

ACCESSORY ATTACHMENT ASSEMBLY FOR CONTAINER

CROSS-REFERENCE TO RELATED APPLICATIONS

This application is a 371 U.S. National Phase of PCT/US23/64327 entitled "ACCESSORY ATTACHMENT ASSEMBLY FOR CONTAINER." filed Mar. 14, 2023, which claims benefit of U.S. Provisional Appl. No. 63/319,401 entitled "ACCESSORY ATTACHMENT ASSEMBLY FOR TOOLBOX," filed Mar. 14, 2022, and of U.S. Provisional Appl. No. 63/431,791 entitled "ACCESSORY ATTACHMENT ASSEMBLY FOR CONTAINER," filed Dec. 12, 2022, the contents of which are hereby incorporated by reference and in their entireties.

TECHNICAL FIELD

The instant disclosure relates to containers, and, more specifically, to an accessory attachment assembly for containers.

DETAILED DESCRIPTION

Figure 1A:
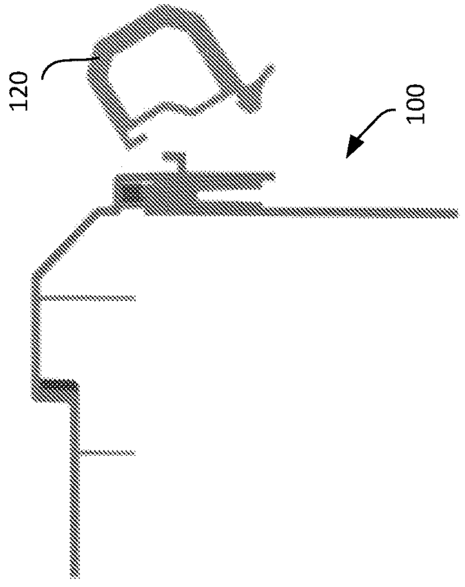
FIGS. 1A-1D are various views of an accessory attachment assembly for containers implemented as a side rail attached to the outer side(s) of the container.
Figure 1B:
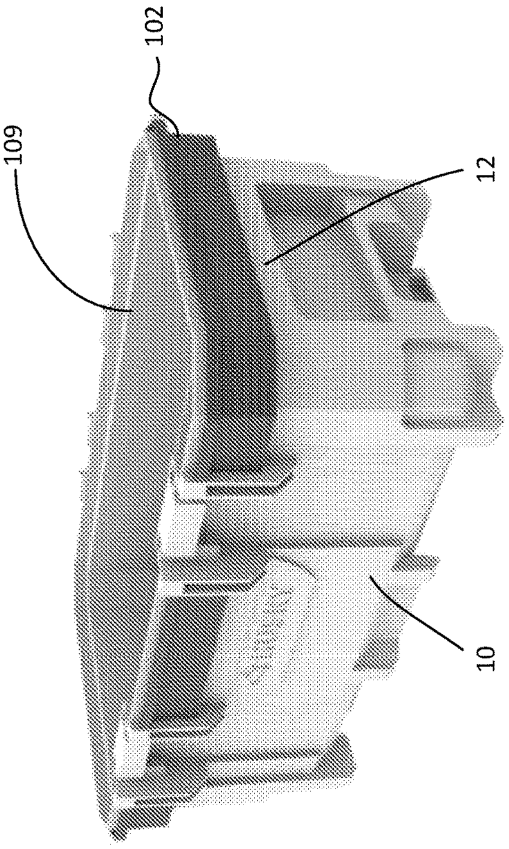

Referring to FIGS. 1A-7 and 11, a container 10 may have or may include an accessory attachment assembly 100. The container 10 may be a toolbox, crate, structure capable of storage, etc. Accessory attachment assembly 100 may be or may include a mounting body 102 that may be positioned on one or more outer walls 12 of container 10. Mounting body 102, as shown in to FIGS. 1A-1D, may include a body 104 with upper and lower mounting tabs 106. Mounting tabs 106 may be used to combine or otherwise couple mounting body 102 to outer wall 12 of container 10. An upper catch 108 and a lower catch 110 may be used to combine removable accessories to mounting body 102, as shown in FIG. 2A and throughout the figures.

Figure 2A:
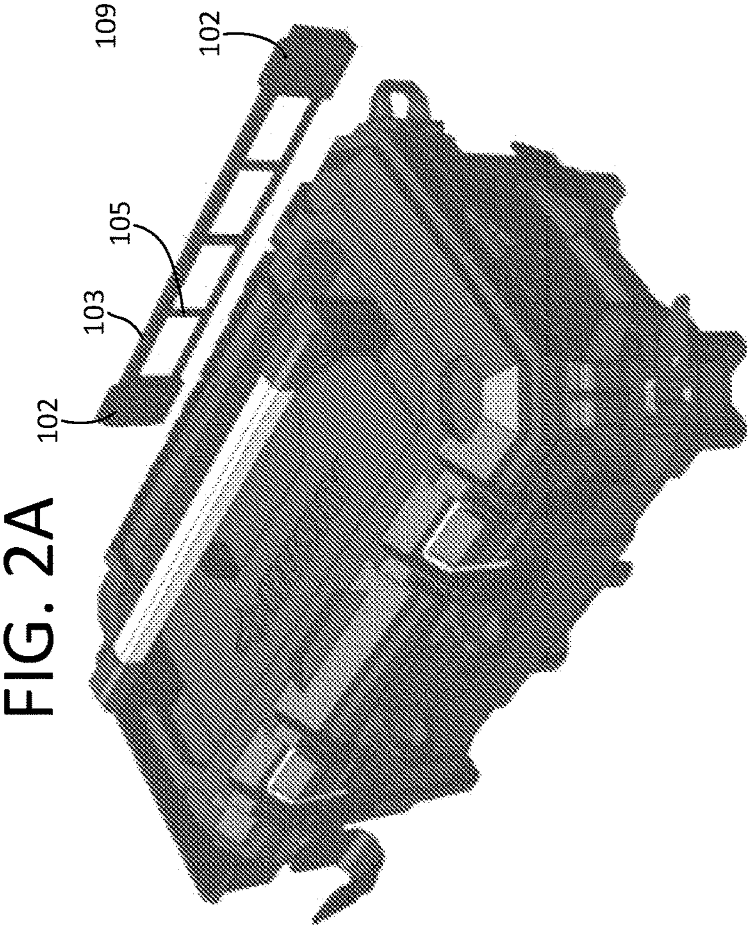
FIGS. 2A-2C are various views of a container for use in an accessory attachment assembly, and components of the container.
Figure 2B:
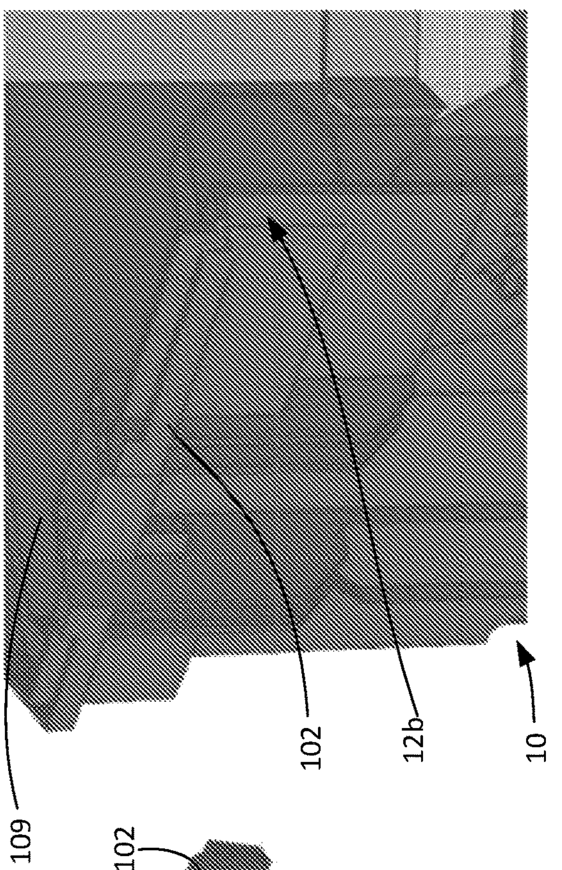
Figure 2C:
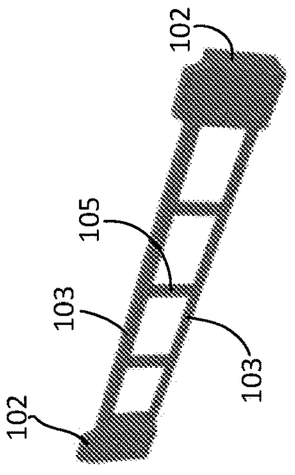

In some embodiments, mounting body 102 may be formed of a solid (e.g., monolithic) piece of material and may be attached to sidewall 12 of container 10 by one or more fasteners through mounting tabs 106. In such embodiments, mounting tabs 106 may have a through hole to align with receiving holes in sidewall 12 or may have any other type of removable fastener system to selectively add or remove mounting body 102 from sidewall 12. In other embodiments, mounting body 102 may be formed integrally with sidewall 12 as part of the manufacturing process of container 10. Mounting body 102 may be formed in sections of various dimensional lengths to extend along sidewall 12 or may be formed as a long rail that extends along all of or a portion of each sidewall 12. Or, in other embodiments, as shown in FIGS. 2A and 2C, a pair of mounting bodies 102 may be combined together by an upper and lower longitudinal rod 103 with one or more lateral supports 105 extending between.

The container 10 may include multiple pairs of opposed sidewalls. For example, as shown in FIG. 1C, the container 10 may include a first pair of opposed sidewalls 12*a*, 12*b*, a second set of opposed sidewalls 12*c*, 12*d*, a third set of opposed sidewalls 12*e*, 12*f*, and a fourth set of opposed sidewalls 12*g*, 12*h*. The mounting body 102, or a portion thereof, may be coupled to both of any of the sets of opposed sidewalls (e.g., both sidewall 12*a* and sidewall 12*b*, and/or both sidewall 12*c* and sidewall 12*d*, etc.). In some embodiments, the mounting body 102, or portions thereof, may be coupled to both opposed sidewalls of multiple sets of opposed sidewalls. In some embodiments, the mounting body 102, or portions thereof, may be coupled to both opposed sidewalls of all sets of opposed sidewalls. The sidewalls 12 may collectively define an interior 109 that, once lid 14 (see FIG. 4) is coupled to the sidewalls 12, may be substantially enclosed, in some embodiments. When coupled to multiple sidewalls 12 or configured in multiple segments, the mounting body 102 may be substantially identical in cross-section throughout.

Upper catch 108 and lower catch 110 may be used to combine removable accessories to mounting body 102. Upper catch 108 and lower catch 110 may be separated from mounting tabs 106 by body 104 which provides structural support for accessories. Upper catch 108 extends upward from body 104 and may be parallel with the upward extending mounting tab 106. Lower catch 110 similarly extends downward from body 104 and may be parallel with the downward extending mounting tab 106. Upper catch 108 and lower catch 110 may be formed of a thickness sufficient to allow for the adding and removal of accessories without snapping off. Upper catch 108 may be further outward from the sidewall 12 to which it is coupled than is the corresponding lower catch 110. The upper catch 108 may also be nearer to the lid 14 than is the lower catch 110 when the lid 14 is coupled to the container 10.

Figure 1C:
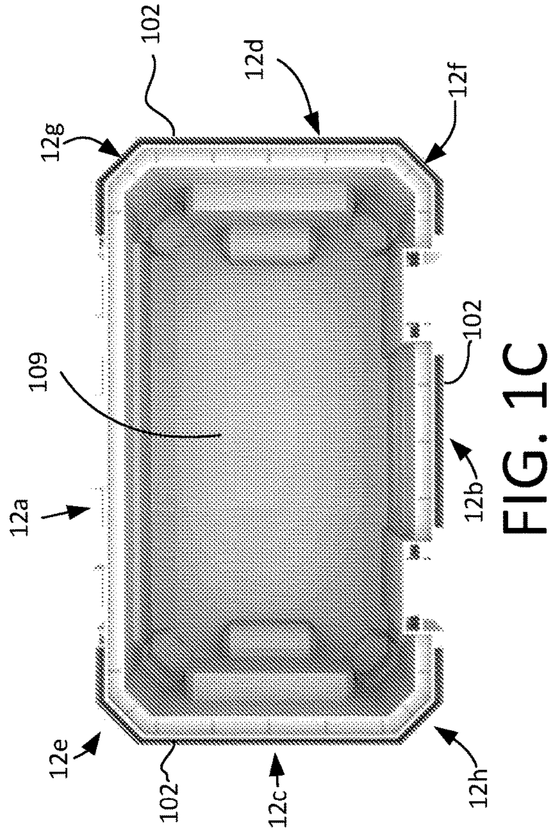
Figure 1D:
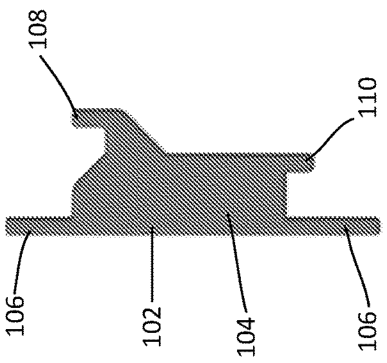
Figure 3B:
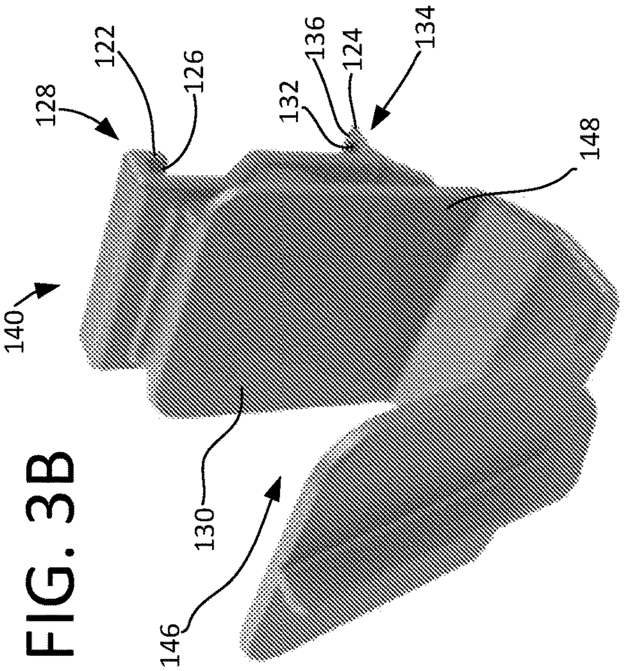
FIGS. 3A-3D are perspective views of example accessories that may find use with an accessory attachment assembly according to the present disclosure.
Figure 3D:
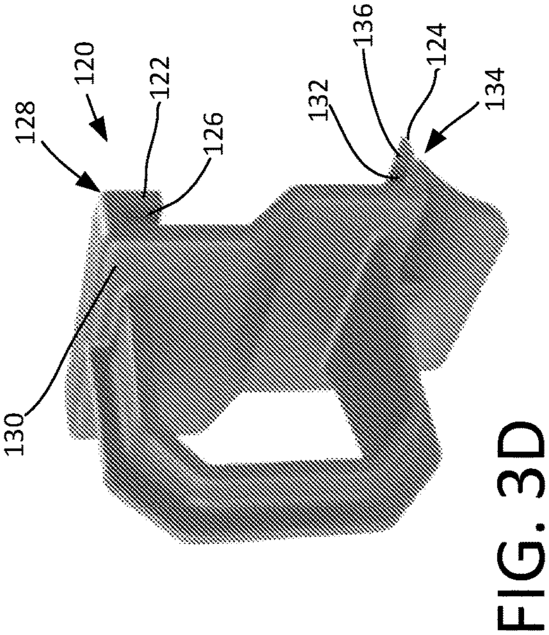

FIGS. 1A and 3D illustrate a first accessory attachment 120 (namely, a utility loop 120) with an upper catch 122 and a lower catch 124 that correspond (and cooperate) with the upper catch 108 and lower catch 110 of mounting body 102. Upper catch 122 may be implemented with a receiver 126 formed from a downward facing u-shaped portion of material 128 off of a body 130 of accessory attachment 120. Lower catch 124 may be implemented with a receiver 132 formed from an upward facing u-shaped portion of material 134 off of body 130. A sliding surface tab 136 may extend laterally from u-shaped portion of material 134 to provide a gliding surface for lower catch 110 of mounting body 102.

In operation, upper catch 122 of accessory attachment 120 is hung on upper catch 108 of mounting body 102 so that upper catch 108 is in receiver 126, then with a little pressure on the bottom portion of the accessory attachment 120, sliding surface tab 136 moves against lower catch 110 of mounting body 102 until lower catch 110 is positioned in receiver 132 of lower catch 124 of accessory attachment 120. The reverse operation is used to separate accessory attachment 120 from mounting body 102.

One skilled in the art will recognize that various ways of removably attaching accessory attachment 120 to mounting body may be provided. The parts may be simply reversed on either the mounting body 102 or the accessory attachment 120 or both; for example, on accessory attachment 120 upper catch 122 may be moved to the bottom and lower catch 124 may be moved to the top, such that the accessory attachment 120 may attach to the mounting body 102 by securing the bottom (e.g., upper catch 122) of the accessory attachment 120 to the mounting body 102 and then pivoting the accessory attachment 120 until the top (e.g., lower catch 124) couples with the mounting body 102.

Figure 3A:
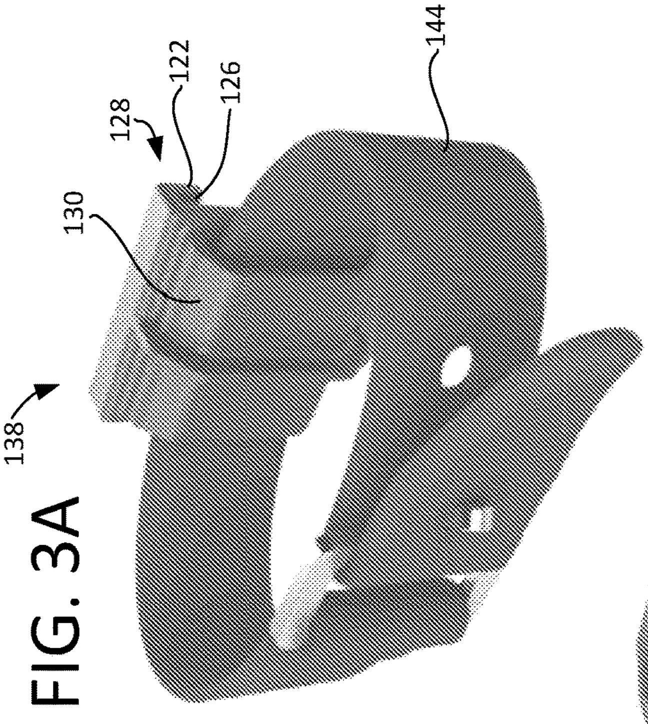
Figure 3C:
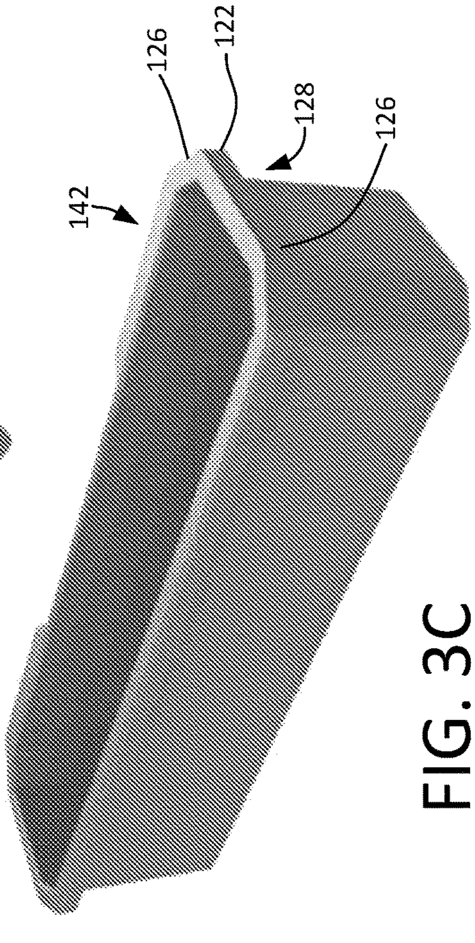

Accessory attachment 120 may come in a wide variety of configurations by modifying body 130. FIGS. 3A-3D shows various implementations of body 130. Mounting body 130 of accessory attachment 120 may be formed as a bin or container to hold material, such as fasteners, a loop to receive a belt strap to hang tools, a hook for hanging objects, such as extension cords. These and other arrangements may be shown in the various figures. Specifically, FIG. 3A illustrates a strap/level holder 138, FIG. 3B illustrates a fixed hook 140, and FIG. 3C illustrates a bin 142. Common to all of the implementations is an upper catch 122 and, in many attachments, a lower catch 124 of accessory attachment 120 that correspond to an upper catch 108 and lower catch 110 of mounting body 102 so that accessory attachment 120 may easily be removed and replaced as needed.

The strap/level holder 138 may also include, coupled to the body 130, an adjustable-length strap 144 that forms a loop that is substantially perpendicular of the direction of extension of the upper catch 122 and the lower catch 124.

The fixed hook 140 may include a U-shaped recess formed by sidewalls 148. The recess may form a channel 146 that is substantially parallel with the sidewall 12 of the container 10 to which the fixed hook 140 is coupled.

The bin 142 may include an interior defined by a plurality of sidewalls 150 and a closed bottom. The bottom may lack a lower catch 110, in some embodiments, and the upper catch 122 of the bin 142 may extend around multiple sidewalls 150, in some embodiments. In other embodiments, the bin 142 may include an upper catch 122 and a lower catch 124 that may be functionally identical to the upper and lower catches 122, 124 of FIG. 3A, 3B, and/or 3D.

Figure 4:
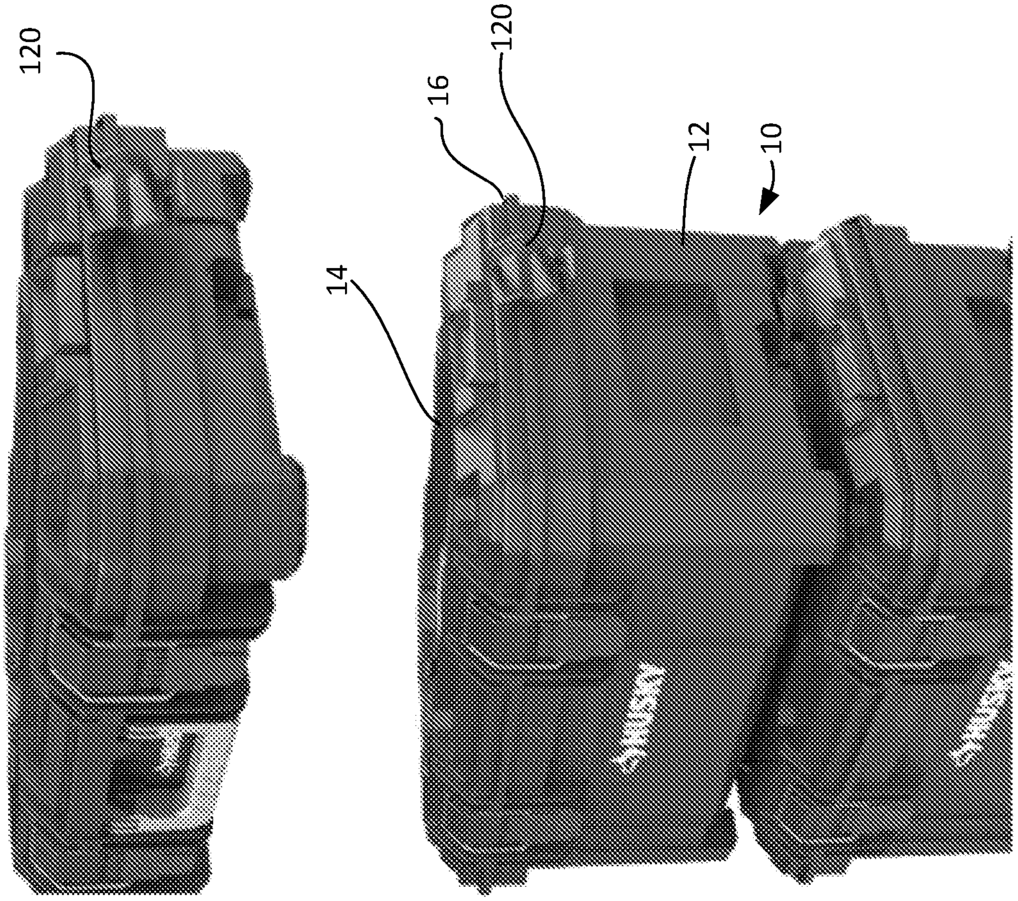
FIG. 4 is a perspective view of a multi-container assembly, each container of which is an accessory attachment assembly.
Figure 5:
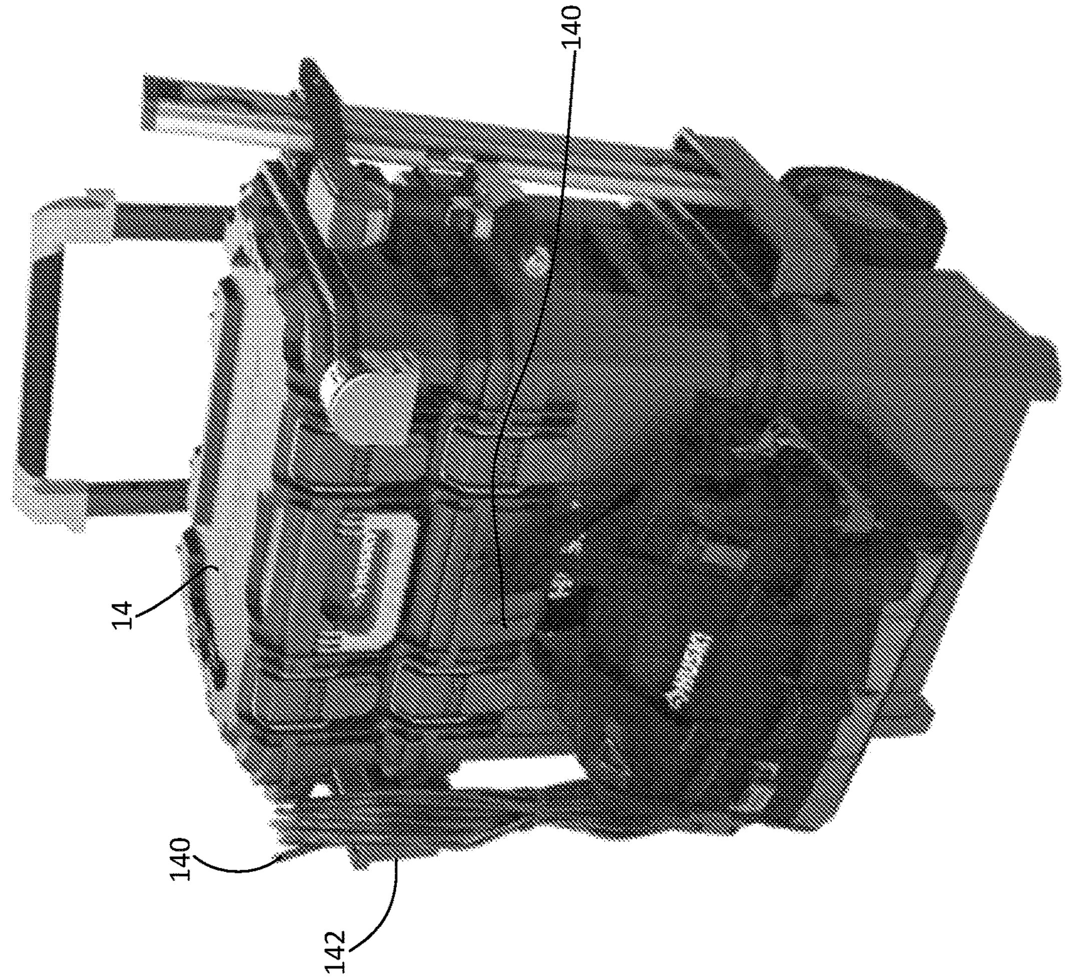
FIG. 5 is a perspective view of the multi-container assembly of FIG. 4, with various accessories attached to the container assembly.
Figure 7:
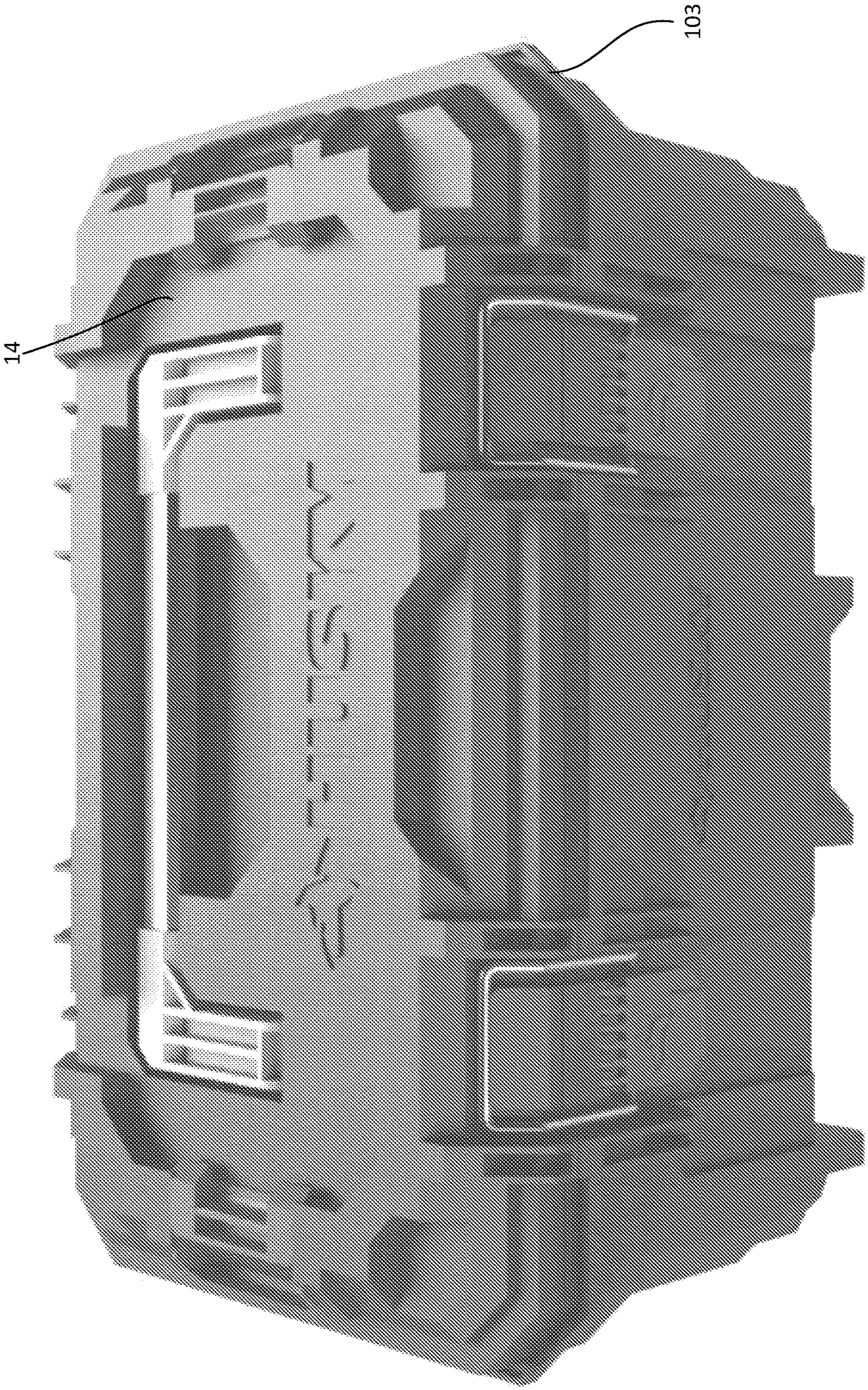
FIG. 7 is a front upper perspective view of a container according to this disclosure.

Referring to FIGS. 1A-1C, 4, and 5, tool box 10 may be formed with a plurality of sidewalls 12 to make an enclosed interior 109 that is selectively accessible by a removable lid 14. Mounting body 102 is preferably along the upper perimeter of sidewalls 12 below the lid 14 so that the lid may be opened and closed without interfering with the accessory attachments (e.g., so that the accessory attachments may be attached to and removed from the container 10 independent of the lid 14, etc.). In one implementation, mounting body 102 is formed in body of tool box 10 with an upper rim 16 forming upper catch 108 so that there is a groove formed between sidewall 12 and upper catch 108 to receive upper catch 122 of accessory attachment 120. Lower catch 110 of mounting body is similarly formed in sidewall 12 so that it is integral and blends in with tool box 10, as shown in FIGS. 4, 5, and 7. Lower catch 110 may extend downward so that there is a groove formed behind lower catch 110 so that lower catch 110 may connect with lower catch 124 of each accessory attachment.

Figure 6B:
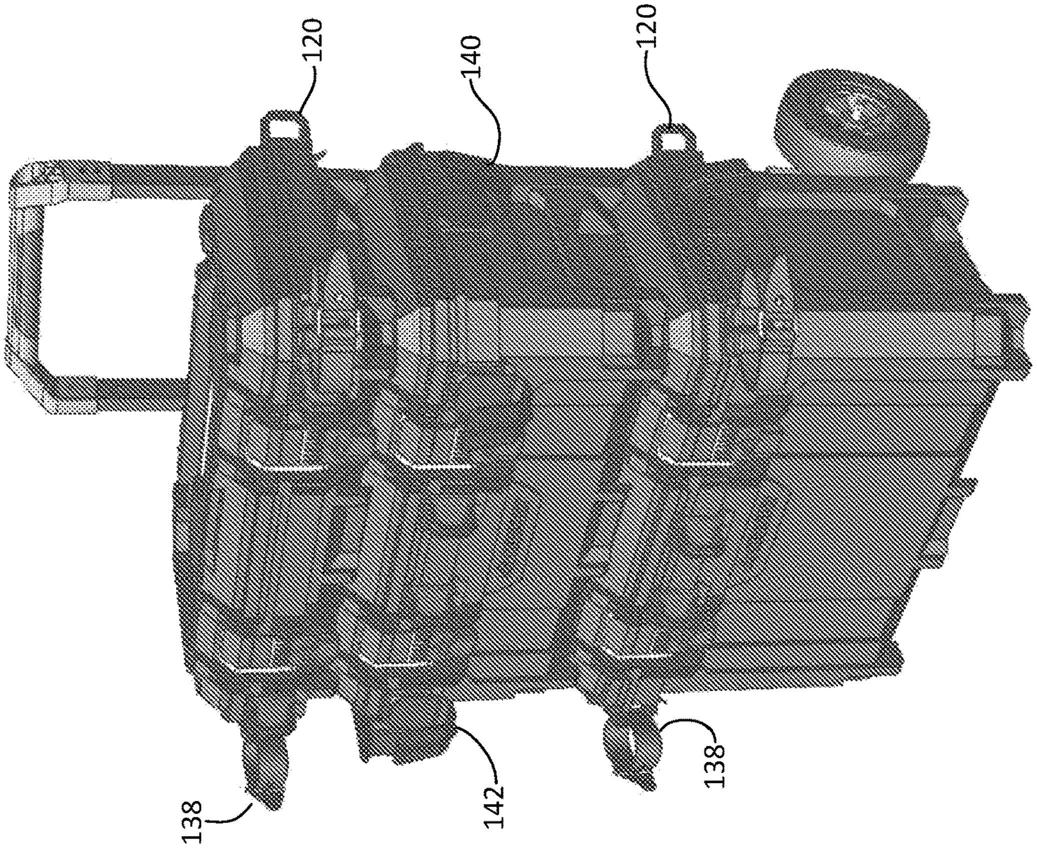
FIGS. 6A and 6B are perspective views of a multi-container assembly, each container of which is an accessory attachment assembly.
Figure 6A:
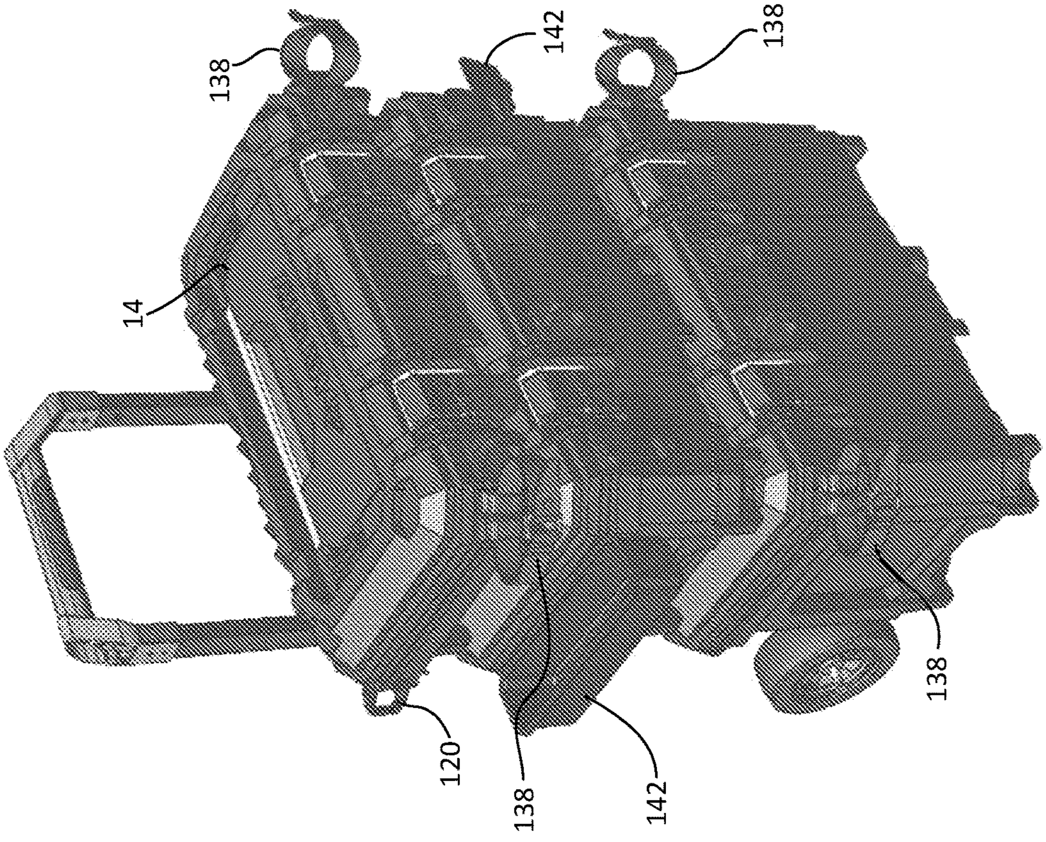
Figure 8:
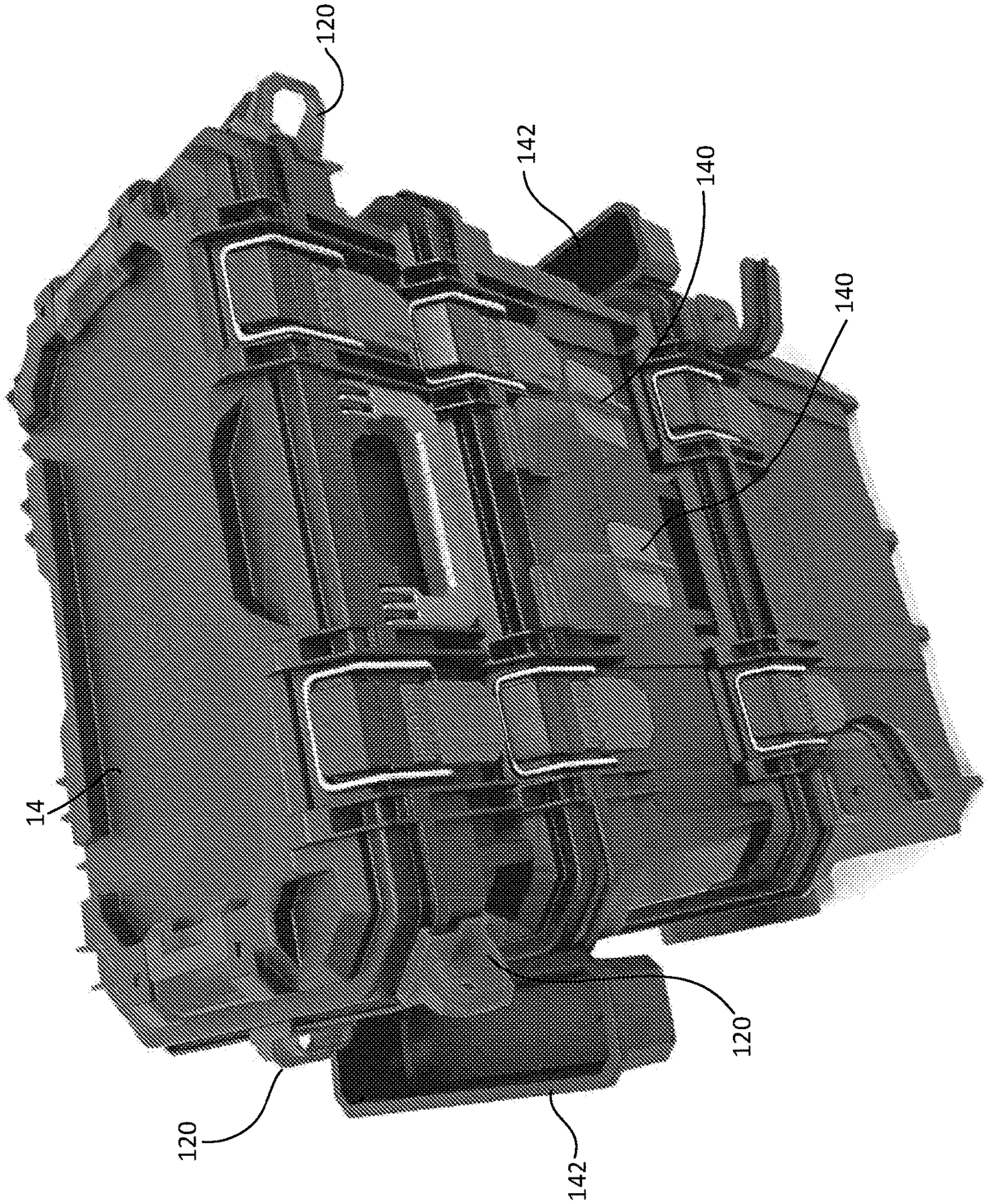
FIG. 8 is a perspective view of an accessory attachment assembly according to this disclosure.

As shown in FIGS. 6A, 6B, and 8, multiple accessories may be coupled to a container 10 at the same time. For example, referring to FIGS. 6A and 6B, a single container 10 may have attached thereto a strap/level holder 138 and a utility loop 120, or a bin 142 and a fixed hook 140, for example.

Figure 9B:
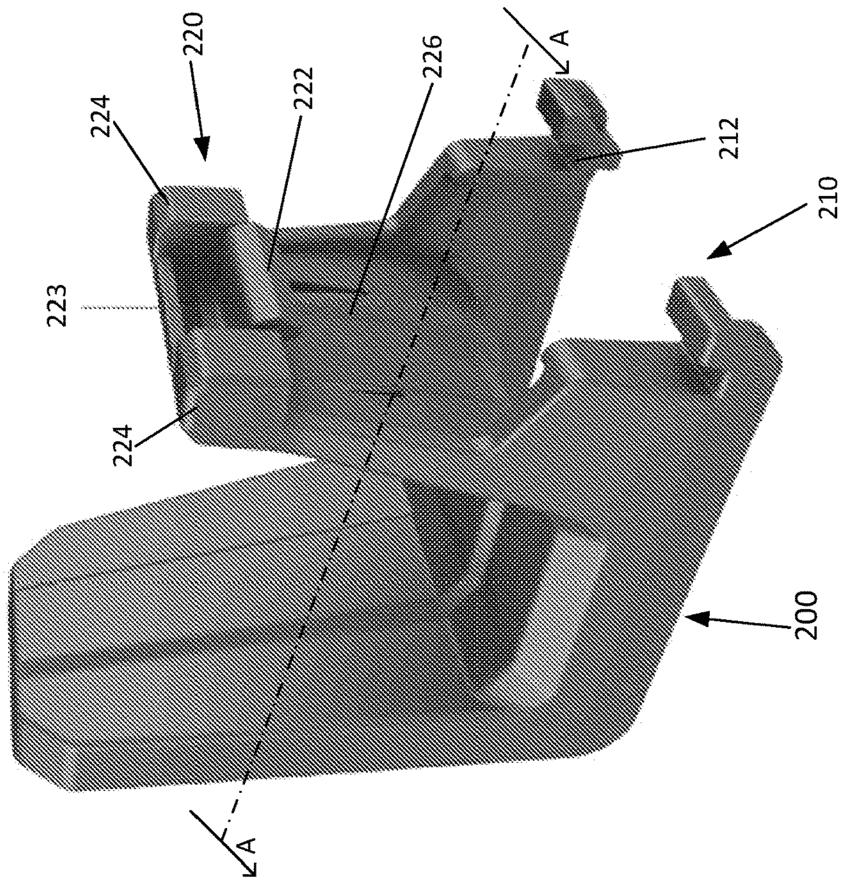
FIG. 9B is a cross-sectional view of the assembly of FIG. 9A. taken along line A-A in FIG. 9A.
Figure 9A:
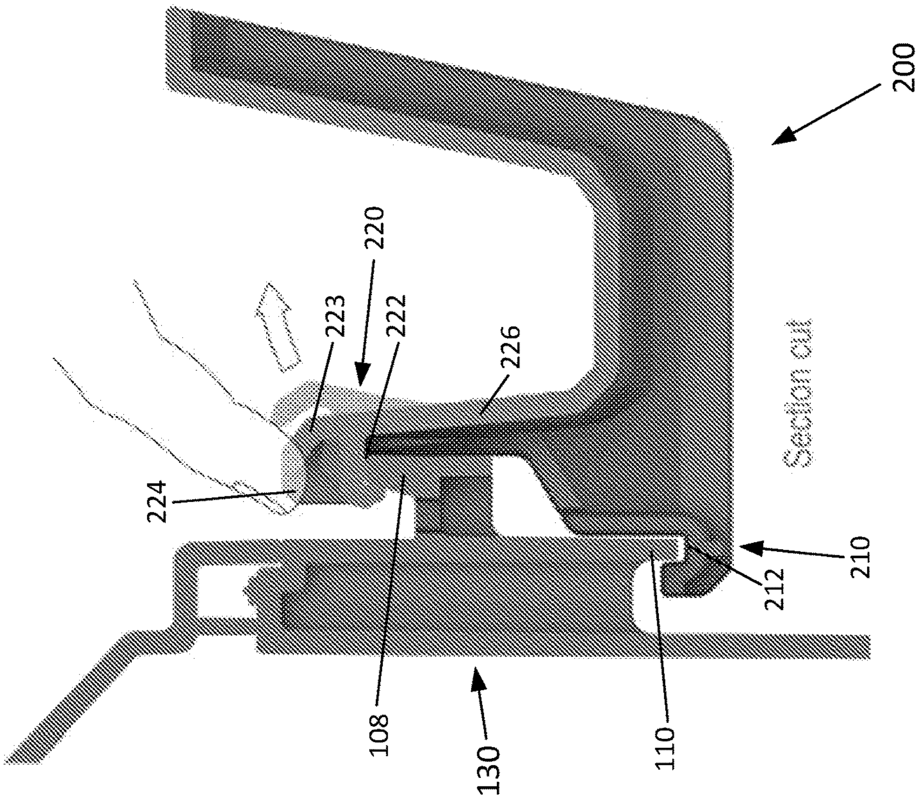
FIG. 9A is a perspective view of an accessory attachment assembly for containers,.

Referring now to FIGS. 9A-B, a first flexible accessory attachment 200 for coupling with the mounting body 130 of tool box 10 is shown. The first flexible accessory attachment 200 has a lower catch 210 configured to interface with lower catch 110 of the mounting body 130, and an upper catch 220 configured to interface with upper catch 108 of the mounting body 130. Lower catch 210 includes a receiver 212 formed from an upward facing u-shaped portion of material extending away from the first flexible accessory attachment 200. Upper catch 220 includes a hook 222, a lip 223, and a pair of protrusions 224. The hook 222 is formed from a downward-facing u-shaped portion of material and is connected to the main body of the first flexible accessory attachment 200 via a central support body 226, which may extend from the lower catch 210 to upper catch 220. The lip 223 is a portion of material between the pair of protrusions 224 that is structured to receive an input (e.g., force) from a user. The central support body 226 is formed of a semi-rigid material, such that the central support is configured to maintain a position but to flex when a sufficient amount of force is applied (e.g., to the lip 223). The pair of protrusions 224 extend away from the first flexible accessory attachment 200 and have a bottom surface that shares a plane with an inner-most point of the hook 222, such that the hook 222 and the pair of protrusions 224 may be each in contact with the upper catch 108 while the first flexible accessory attachment 200 is in position on the mounting body 130.

In practice, the first flexible accessory attachment 200 is coupled to the mounting body 130 by positioning the receiver 212 on the lower catch 110 and pivoting the first flexible accessory attachment 200 towards the container 10 about the lower catch 110 until the upper catch 220 abuts the upper catch 108. Pivoting the first flexible accessory attachment 200 more causes the central support body 226 to flex until the hook 222 snaps in place on the upper catch 108. To then release the first flexible accessory attachment 200, force is applied to the lip 223, which causes the central support body 226 to flex and the hook 222 to de-couple from the upper catch 108.

Figure 10B:
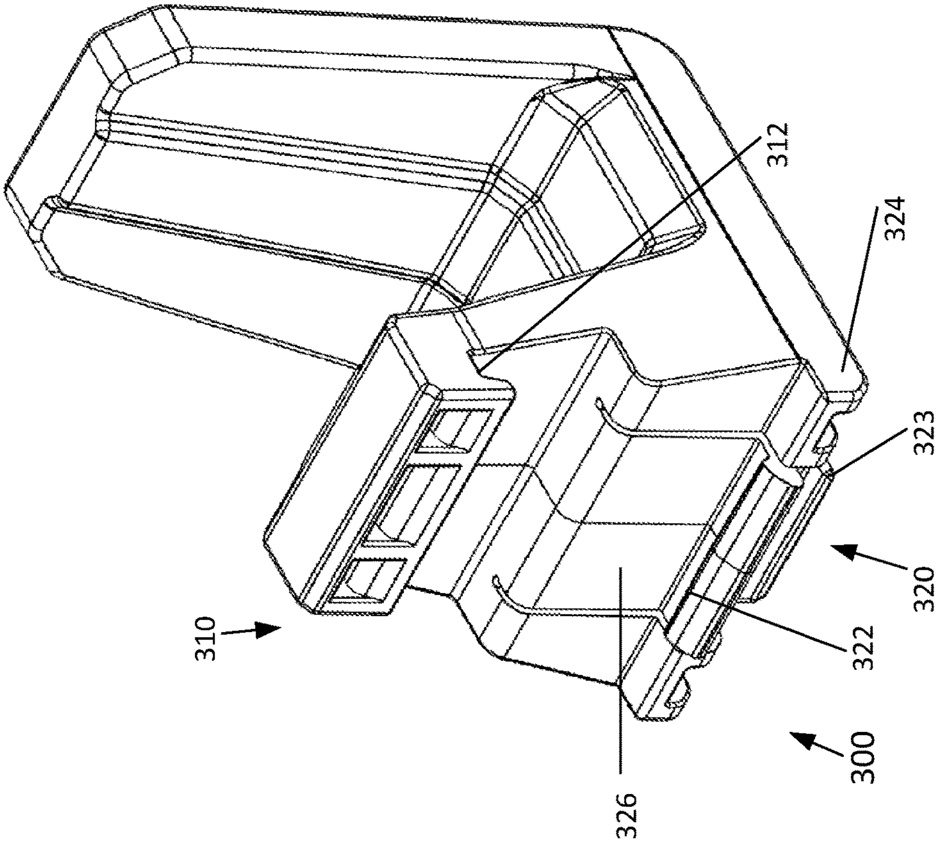
FIG. 10B is a side view of the assembly of FIG. 10A, with a coupled container shown in cross-section.
Figure 10A:
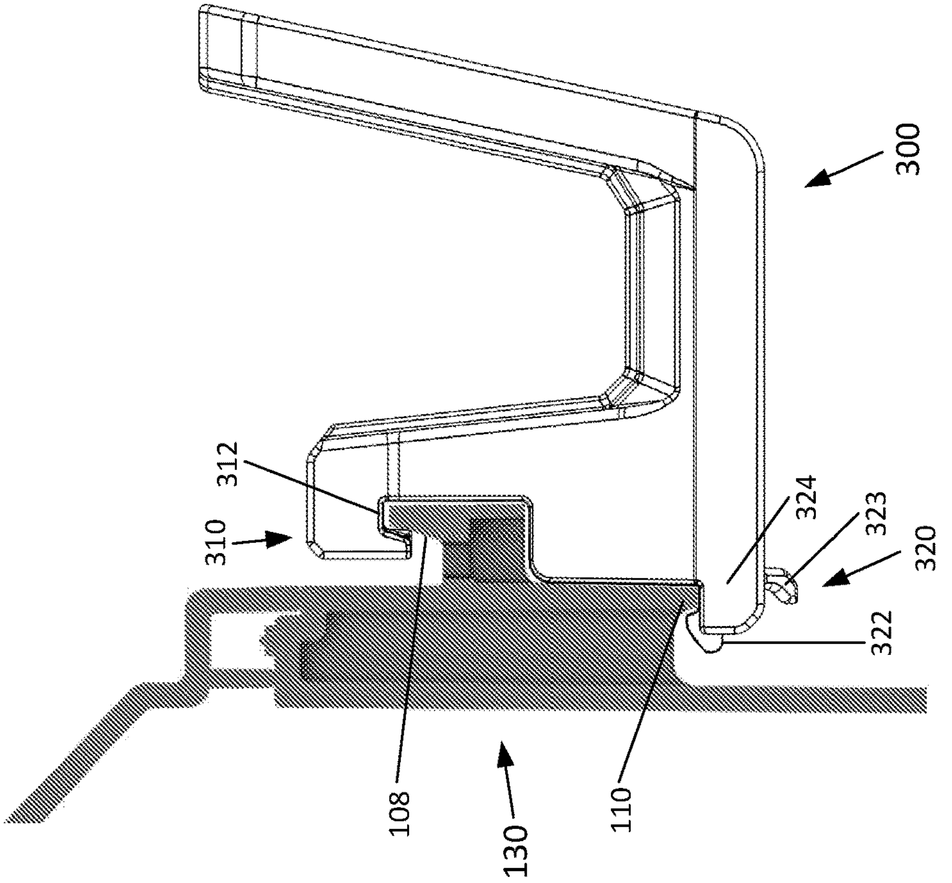
FIG. 10A is a perspective view of an accessory attachment assembly for containers.
Figure 11:
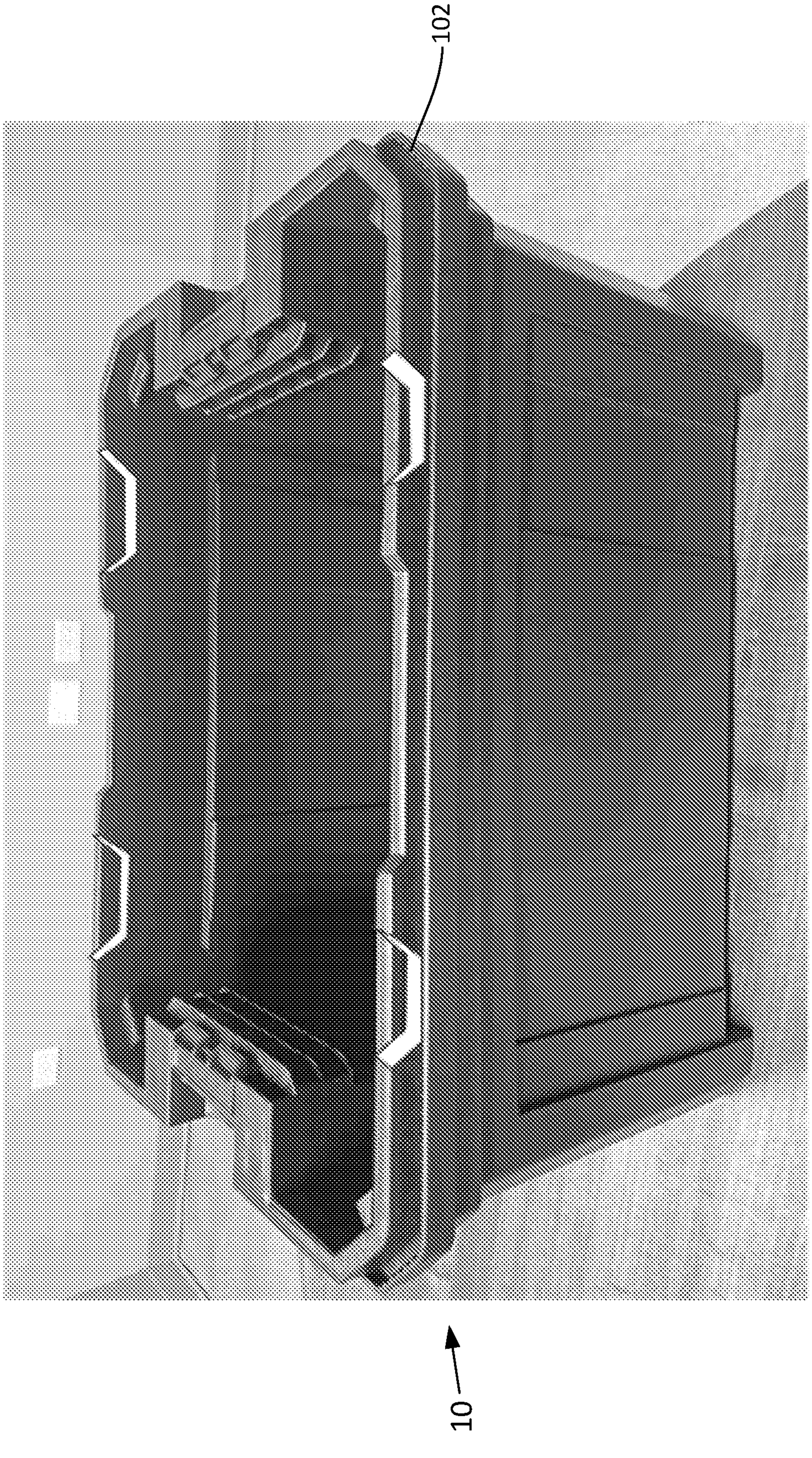
FIG. 11 is a perspective view of a container according to this disclosure.

Referring now to FIGS. 10A-B, a second flexible accessory attachment 300 for coupling with the mounting body 130 of tool box 10 is shown. The second flexible accessory attachment 300 is similar to the first flexible accessory attachment 200, but the attachment mechanism portion (e.g., the portion of the second flexible accessory attachment 300 that attaches to the mounting body 130) is a mirror image of the corresponding portion of the first flexible accessory attachment 200 across an x-axis.

As shown, the second flexible accessory attachment 300 has an upper catch 310 configured to interface with upper catch 108 of the mounting body 130, and a lower catch 320 configured to interface with lower catch 110 of the mounting body 130. Upper catch 310 includes a receiver 312 formed from an downward facing u-shaped portion of material extending away from the second flexible accessory attachment 300. Lower catch 320 includes a hook 322, a lip 323, and a pair of protrusions 324. The hook 322 is formed from an upward-facing u-shaped portion of material and is connected to the main body of the second flexible accessory attachment 300 via a central support 326. The lip 323 is a portion of material between the pair of protrusions 224 that is structured to receive an input (e.g., force) from a user. The central support 326 is formed of a semi-rigid material, such that the central support is configured to maintain a position but to flex when a sufficient amount of force is applied (e.g., to the lip 323). The pair of protrusions 324 extend away from the second flexible accessory attachment 300 and have a bottom surface that shares a plane with an inner-most point of the hook 322, such that the hook 322 and the pair of protrusions 324 may be each in contact with the lower catch 110 while the second flexible accessory attachment 300 is in position on the mounting body 130.

In practice, the second flexible accessory attachment 300 is coupled to the mounting body 130 by positioning the receiver 312 on the upper catch 108 and pivoting the second flexible accessory attachment 300 towards the container 10 about the upper catch 108 until the lower catch 320 abuts the lower catch 110. Pivoting the second flexible accessory attachment 300 more causes the central support 326 to flex until the hook 322 snaps in place on the lower catch 110. To then release the second flexible accessory attachment 300, force is applied to the lip 323, which causes the central support 326 to flex and the hook 322 to de-couple from the lower catch 110.

Figure 12:
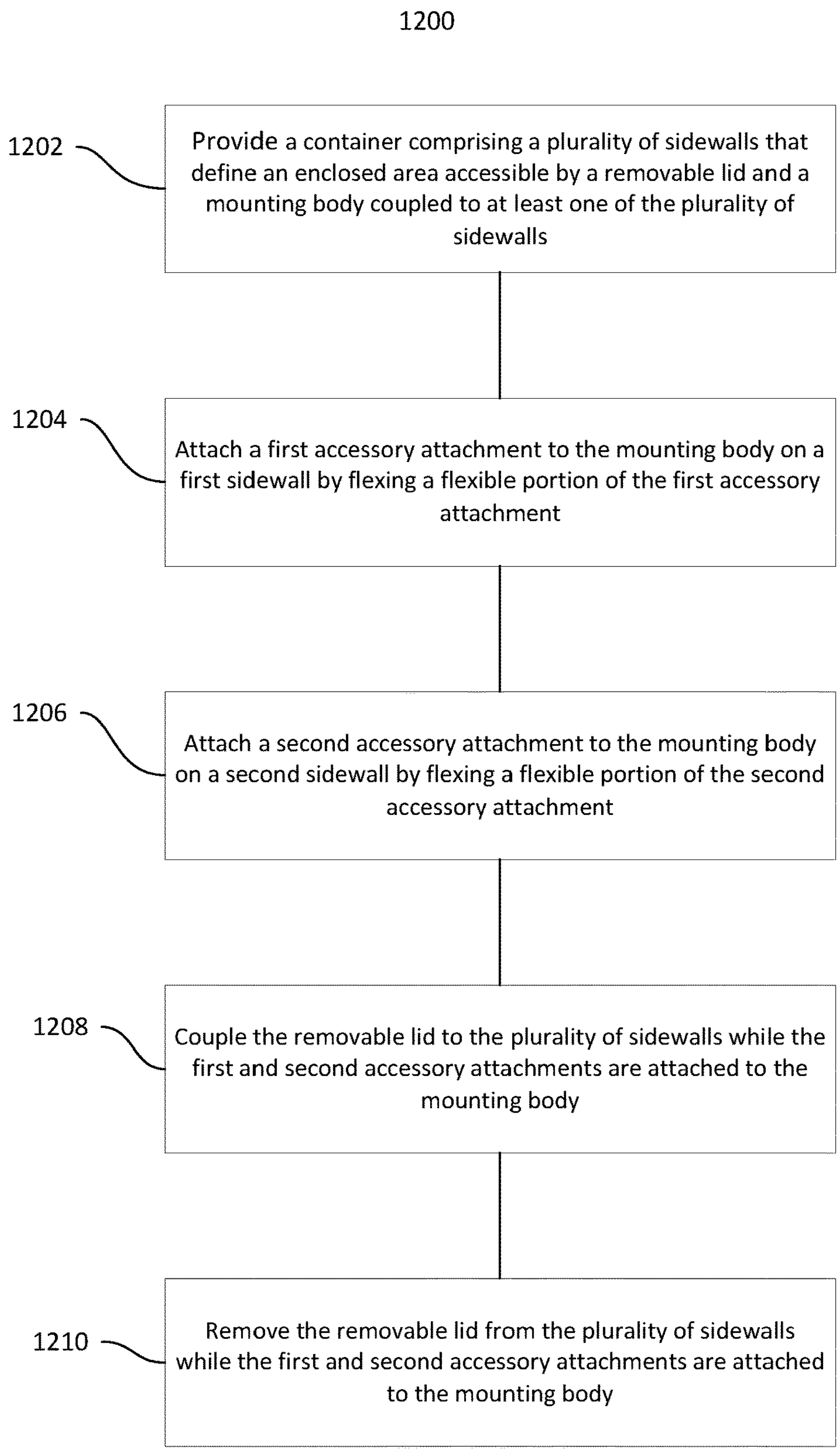
FIG. 12 is a flow chart illustrating an example method of using a container according to this disclosure.

FIG. 12 is a flow chart illustrating an example method 1200 of use of a container with flexible attachments. The method may be performed by an end user of the container, and/or by a assembler or manufacturer of the container in the course of assembly or manufacture (e.g., in testing of the manufactured or assembled product).

The method 1200 may include, at block 1202, providing a container according to the present disclosure, e.g., a container having a plurality of sidewalls that define an enclosed area accessible by a removable lid and a mounting body coupled to at least one of the plurality of sidewalls.

The method 1200 may further include, at block 1204, attaching a first accessory attachment to the mounting body on a first sidewall by flexing a flexible portion of the first accessory attachment. The first sidewall may be one of a pair of opposed sidewalls. For example, referring to FIG. 1C, the first sidewall may be sidewall 12*c*.

The method 1200 may further include, at block 1206, attaching a second accessory attachment to the mounting body on a second sidewall by flexing a flexible portion of the second accessory attachment. The second sidewall may be the other of the pair of opposed sidewalls. For example, referring to FIG. 1C, the second sidewall may be sidewall 12*d*.

The method 1200 may further include, at block 1208, coupling the removable lid to the plurality of sidewalls while the first and second accessory attachments may be attached to the mounting body. In some embodiments, the removable lid may be coupled to an upper lip defined by the plurality of sidewalls. Because the upper lip may be both vertically and horizontally separated from the mounting body (e.g., the upper lip may be above and inward of the mounting body), the removable lid may be coupled to the upper lip without disturbing the accessory attachments.

The method 1200 may further include, at block 1210, removing the removable lid from the plurality of sidewalls while the first and second accessory attachments may be attached to the mounting body. In some embodiments, the removable lid may be removed from the upper lip defined by the plurality of sidewalls. Because the upper lip may be both vertically and horizontally separated from the mounting body (e.g., the upper lip may be above and inward of the mounting body), the removable lid may be removed from the upper lip without disturbing the accessory attachments.

Just as the removable lid may be coupled to and removed from the sidewalls while the attachments may be attached to the mounting body, so too the attachments may be coupled to the mounting body and removed from the mounting body while the lid is attached, due to the separation between the mounting body and the upper lip, in some embodiments.

In a first aspect of this disclosure, a container is provided that includes a plurality of sidewalls that define an enclosed area accessible by a removable lid, a mounting body coupled to at least one of the plurality of sidewalls, and an accessory attachment selectively attachable to the mounting body, the accessory attachment comprising a flexible portion that flexes to permit coupling of the accessory attachment to the mounting body.

In an embodiment of the first aspect, the mounting body comprises an upper catch and a lower catch, and wherein the accessory attachment comprises an upper catch and a lower catch each of which cooperate with a corresponding upper catch and the lower catch of the mounting body for selective attachment of the accessory attachment to the mounting body. In a further embodiment of the first aspect, the accessory attachment further comprises a support body extending from the accessory attachment upper catch to the accessory attachment lower catch, wherein the flexible portion comprises the support body. In a further embodiment of the first aspect, the upper catch and the lower catch of the mounting body may be substantially parallel to the at least one of the plurality of sidewalls.

In an embodiment of the first aspect, the container comprises a first pair of opposed sidewalls and a second pair of opposed sidewalls, wherein the mounting body is coupled to at least one of the first pair of opposed sidewalls or the second pair of opposed sidewalls.

In an embodiment of the first aspect, the mounting body comprises an upper catch and a lower catch, the upper catch nearer to the removable lid than is the lower catch, wherein the upper catch is further outward from the at least one of the plurality of sidewalls than is the lower catch.

In an embodiment of the first aspect, the plurality of sidewalls define an upper lip configured to be coupled to the removable lid, wherein the mounting body is below the upper lip.

In an embodiment of the first aspect, the accessory attachment comprises two or more different accessory attachments, wherein the two or more different accessory attachments may be selectively attachable to the mounting body at the same time.

In a second aspect of the present disclosure, a method is provided that includes providing a container comprising a plurality of sidewalls that define an enclosed area accessible by a removable lid and a mounting body coupled to at least one of the plurality of sidewalls, attaching an accessory attachment to the mounting body by flexing a flexible portion of the accessory attachment, and coupling the removable lid to the plurality of sidewalls while the accessory attachment is attached to the mounting body.

In an embodiment of the second aspect, the mounting body comprises an upper catch and a lower catch, the accessory attachment comprises an upper catch and a lower catch, and attaching the accessory attachment to the mounting body comprises coupling the upper catch of the accessory attachment to the upper catch of the mounting body and by coupling the lower catch of the accessory attachment to the lower catch of the mounting body.

In an embodiment of the second aspect, attaching the accessory attachment to the mounting body comprises coupling the upper catch of the accessory attachment to the upper catch of the mounting body, flexing the support body while pivoting the accessory attachment about the upper catch of the mounting body, and coupling the lower catch of the accessory attachment to the lower catch of the mounting body.

In an embodiment of the second aspect, attaching the accessory attachment to the mounting body comprises coupling the lower catch of the accessory attachment to the lower catch of the mounting body, flexing the support body while pivoting the accessory attachment about the lower catch of the mounting body, and coupling the upper catch of the accessory attachment to the upper catch of the mounting body.

In an embodiment of the second aspect, the container comprises a first pair of opposed sidewalls and a second pair of opposed sidewalls, wherein the mounting body is coupled to at least one of the first pair of opposed sidewalls or the second pair of opposed sidewalls.

In an embodiment of the second aspect, the mounting body comprises an upper catch and a lower catch, the upper catch nearer to the removable lid than is the lower catch, wherein the upper catch is further outward from the at least one of the plurality of sidewalls than is the lower catch.

In an embodiment of the second aspect, the plurality of sidewalls define an upper lip, wherein coupling the removable lid to the plurality of sidewalls comprises coupling the removable lid to the upper lip, wherein the mounting body is below the upper lip.

In an embodiment of the second aspect, the accessory attachment is a first accessory attachment, further comprising attaching a second accessory attachment to the mounting body by flexing a flexible portion of the second accessory attachment while the first accessory attachment is attached to the mounting body.

In a third aspect of the present disclosure, a container is provided that includes a plurality of sidewalls that define an enclosed area accessible by a removable lid, a mounting body integral with at least one of the plurality of sidewalls, and an accessory attachment selectively attachable to the mounting body, the accessory attachment comprising an upper catch, a lower catch, and a flexible support body that flexes to the upper catch and lower catch to be coupled to the mounting body.

In an embodiment of the third aspect, the plurality of sidewalls comprises a first pair of opposed sidewalls and a second pair of opposed sidewalls, wherein the mounting body is integral with the first pair of opposed sidewalls.

In an embodiment of the third aspect, the accessory attachment is a first accessory attachment removably attached to a first wall of the first pair of opposed sidewalls, the container further comprising a second accessory attachment removably attached to a second wall of the first pair of opposed sidewalls.

In an embodiment of the third aspect, each of the upper catch and the lower catch comprises a generally rectangular protrusion that is substantially parallel to the at least one of the plurality of sidewalls when the accessory attachment is attached to the mounting body.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

We claim:

1. A container comprising:
- a plurality of sidewalls that define an enclosed area accessible by a removable lid;
- a mounting body comprising an upper catch and a lower catch, the mounting body coupled to at least one of the plurality of sidewalls and at least one adjoining sidewall; and
- an accessory attachment selectively attachable to the mounting body, the accessory attachment comprising:
  - a flexible portion that flexes to permit coupling of the accessory attachment to the mounting body;
  - an upper catch; and
  - a lower catch;
- wherein each of the upper catch and lower catch of the accessory attachment cooperate with the corresponding upper catch and lower catch of the mounting body.

2. The container of claim 1, wherein the accessory attachment further comprises a support body extending from the accessory attachment upper catch to the accessory attachment lower catch, wherein the flexible portion comprises the support body.

3. The container of claim 1, wherein the upper catch and the lower catch of the mounting body are substantially parallel to the at least one of the plurality of sidewalls.

4. The container of claim 1, wherein the container comprises a first pair of opposed sidewalls and a second pair of opposed sidewalls, wherein the mounting body is coupled to at least one of the first pair of opposed sidewalls or the second pair of opposed sidewalls.

5. The container of claim 1, wherein the mounting body upper catch is nearer to the removable lid than is the lower catch, wherein the upper catch is further outward from the at least one of the plurality of sidewalls than is the lower catch.

6. The container of claim 1, wherein the plurality of sidewalls define an upper lip configured to be coupled to the removable lid, wherein the mounting body is below the upper lip.

7. The container of claim 1, wherein the accessory attachment comprises two or more different accessory attachments, wherein the two or more different accessory attachments are selectively attachable to the mounting body at a same time.

8. A method comprising:
- providing a container comprising a plurality of sidewalls that define an enclosed area accessible by a removable lid and a mounting body comprising an upper catch and a lower catch, the mounting body coupled to at least three of the plurality of sidewalls;
- attaching an accessory attachment comprising an upper catch and a lower catch to the mounting body by flexing a flexible portion of the accessory attachment, coupling the upper catch of the accessory attachment to the upper catch of the mounting body and by coupling the lower catch of the accessory attachment to the lower catch of the mounting body; and coupling the removable lid to the plurality of sidewalls while the accessory attachment is attached to the mounting body.

9. The method of claim 8, wherein the accessory attachment further comprises a support body extending from the accessory attachment upper catch to the accessory attachment lower catch, wherein the flexible portion comprises the support body.

10. The method of claim 9, wherein attaching the accessory attachment to the mounting body comprises:

coupling the upper catch of the accessory attachment to the upper catch of the mounting body;

flexing the support body while pivoting the accessory attachment about the upper catch of the mounting body; and coupling the lower catch of the accessory attachment to the lower catch of the mounting body.

11. The method of claim 9, wherein attaching the accessory attachment to the mounting body comprises:

coupling the lower catch of the accessory attachment to the lower catch of the mounting body;

flexing the support body while pivoting the accessory attachment about the lower catch of the mounting body; and coupling the upper catch of the accessory attachment to the upper catch of the mounting body.

12. The method of claim 8, wherein the mounting body upper catch is nearer to the removable lid than is the lower catch, wherein the upper catch is further outward from the at least one of the plurality of sidewalls than is the lower catch.

13. The method of claim 8, wherein the plurality of sidewalls define an upper lip, wherein coupling the removable lid to the plurality of sidewalls comprises coupling the removable lid to the upper lip, wherein the mounting body is below the upper lip.

14. The method of claim 8, wherein the accessory attachment is a first accessory attachment, further comprising attaching a second accessory attachment to the mounting body by flexing a flexible portion of the second accessory attachment while the first accessory attachment is attached to the mounting body.

* * * * *